United States Patent
Yoshitomi et al.

(10) Patent No.: US 9,835,468 B2
(45) Date of Patent: Dec. 5, 2017

(54) ENTRY DETECTION APPARATUS AND ENTRY DETECTION METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naoto Yoshitomi, Kariya (JP); Jian Hu, Kariya (JP); Shota Satomura, Kariya (JP); Yusuke Fujimaki, Nissin (JP)

(73) Assignees: DENSO CORPORATION, Kariya, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/166,639

(22) Filed: May 27, 2016

(65) Prior Publication Data

US 2016/0349072 A1    Dec. 1, 2016

(30) Foreign Application Priority Data

May 29, 2015   (JP) ................. 2015-110566

(51) Int. Cl.
  *G08G 1/00* (2006.01)
  *G08G 1/065* (2006.01)
  *G01C 21/36* (2006.01)

(52) U.S. Cl.
  CPC ..... *G01C 21/3602* (2013.01); *G01C 21/3626* (2013.01)

(58) Field of Classification Search
  CPC .... G01C 21/3626; G01C 21/26; G01C 21/28; G01C 21/3602; G08G 1/09623; G08G 1/056; G06K 9/00798; G06K 9/00818
  (Continued)

(56) References Cited

U.S. PATENT DOCUMENTS

| | | | | |
|---|---|---|---|---|
| 6,862,524 B1 * | 3/2005 | Nagda | ............... | G01C 21/3492 340/988 |
| 7,650,236 B2 * | 1/2010 | Tolmei | ................. | G01C 21/26 701/117 |

(Continued)

FOREIGN PATENT DOCUMENTS

| | | |
|---|---|---|
| JP | 2007-139531 A | 6/2007 |
| JP | 2007-293390 A | 11/2007 |

*Primary Examiner* — John A Tweel, Jr.
(74) *Attorney, Agent, or Firm* — Knobbe, Martens, Olson & Bear, LLP

(57) ABSTRACT

An entry detection apparatus includes a position detection unit that detects presence of an entry prohibited road ahead of a vehicle based on a position of the vehicle and map data including information showing, for each road section, whether the road section is an entry prohibited road section, a sign detection unit that detects whether or not a pair of no-entry signs are present on both sides of a running course of the vehicle based on an image captured by an image sensor mounted on the vehicle, and determines whether or not the vehicle has passed between the no-entry signs, and an entry determination unit that determines that the vehicle has entered the entry prohibited road if the position detection unit detects presence of the entry prohibited road, and the sign detection unit determines that the vehicle has passed between the no-entry signs.

9 Claims, 3 Drawing Sheets

(58) Field of Classification Search
USPC .......................................................... 340/928
See application file for complete search history.

(56) References Cited

U.S. PATENT DOCUMENTS

| | | | |
|---|---|---|---|
| 2009/0276153 A1* | 11/2009 | Lee | G01C 21/28 |
| | | | 701/414 |
| 2015/0071496 A1* | 3/2015 | Jeschke | G06K 9/00818 |
| | | | 382/104 |
| 2015/0220796 A1 | 8/2015 | Yokoi | |
| 2016/0217688 A1* | 7/2016 | Jeschke | G06K 9/00798 |
| 2016/0225256 A1* | 8/2016 | Hofsaess | G08G 1/056 |

* cited by examiner

| LINK ID | 0001 |
|---|---|
| ROAD TYPE | EXPRESS WAY, LOCAL WAY etc. |
| FOLLOWING-LINK INFORMATION | LEFT RAMP, RIGHT RAMP, SERVICE AREA etc. |
| ENTRY PROHIBITION INFORMATION | NO-ENTRY FROM LEFT (OR RIGHT OR STRAIGHT) DIRECTION |
| ⋮ | ⋮ |

ENTRY DETECTION APPARATUS AND ENTRY DETECTION METHOD

This application claims priority to Japanese Patent Application No. 2015-110566 filed on May 29, 2015, the entire contents of which are hereby incorporated by reference.

BACKGROUND OF THE INVENTION

1. Field of the Invention

The present invention relates to an entry detection apparatus and method for detecting entry of a vehicle into an entry prohibited road.

2. Description of Related Art

Japanese Patent Application Laid-open No. 2007-293390 describes a warning device which detects whether an own vehicle is running in the wrong direction based on a road sign in an image ahead of the own vehicle captured by an image sensor, and gives a warning to the vehicle driver if the own vehicle is detected to be running in the wrong direction.

Also, there is known a car navigation device configured to associate information showing entry prohibition with link information showing a road section. According to this car navigation device, it is possible to identify the road section in which the own vehicle is running using information showing the position of the own vehicle, and determine whether or not the own vehicle is running on an entry prohibited road using the link information.

However, since installation places of road signs vary from country to country, the warning device described in the above patent document cannot completely correctly determine whether the own vehicle is running in the wrong direction. Accordingly, there may be a case where the warning device issues a warning although the own vehicle is not running in the wrong direction.

On the other hand, in a case where the position of the own vehicle is detected using a car navigation device, since the GPS positioning error may be as large as several meters, an error may occur in determining whether or not the own vehicle is entering an entry prohibited road, for example, when the entry prohibited road is adjacent to an expressway ramp.

SUMMARY

An exemplary embodiment provides an entry detection apparatus including:

a position detection unit that detects presence of an entry prohibited road ahead of a vehicle based on a position of the vehicle and map data including information showing, for each road section, whether the road section is an entry prohibited road section;

a sign detection unit that detects whether or not a pair of no-entry signs are present on both sides of a running course of the vehicle based on an image captured by an image sensor mounted on the vehicle, and determines whether or not the vehicle has passed between the no-entry signs; and an entry determination unit that determines that the vehicle has entered the entry prohibited road if the position detection unit detects presence of the entry prohibited road, and the sign detection unit determines that the vehicle has passed between the no-entry signs.

According to the exemplary embodiment, there is provided an entry detection apparatus and an entry detection method that can reliably detecting whether a vehicle has entered an entry prohibited road.

Other advantages and features of the invention will become apparent from the following description including the drawings and claims.

PREFERRED EMBODIMENTS OF THE INVENTION

Figures 1, 2:
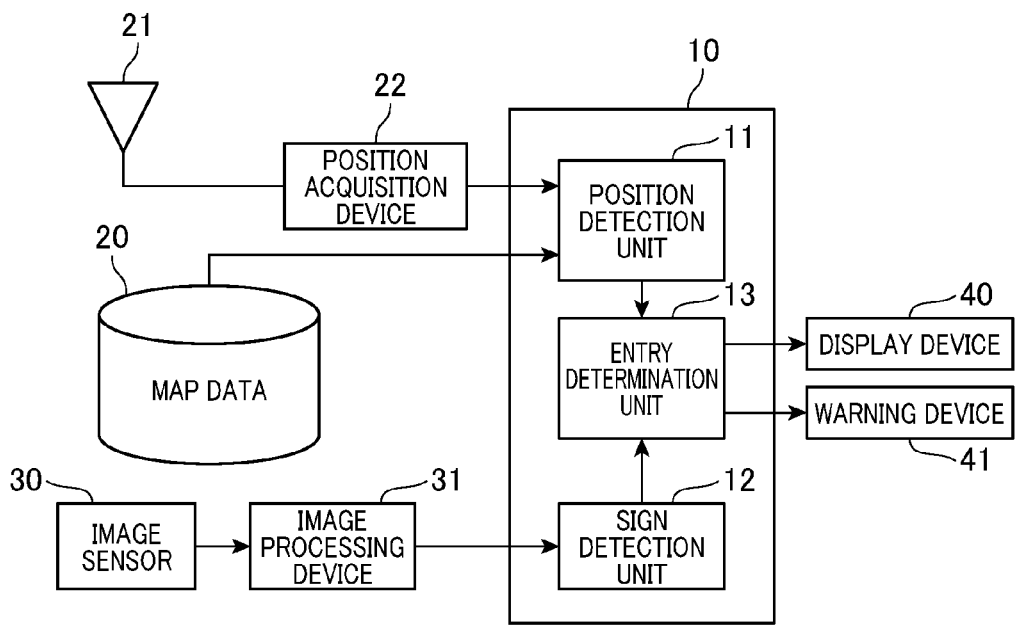
FIG. 1 is a diagram showing the structure of an entry detection apparatus according to an embodiment of the invention.
FIG. 2 is a diagram showing contents of link information contained in map data for use in the entry detection apparatus.

FIG. 1 is a diagram showing the structure of an entry detection apparatus 10 according to an embodiment of the invention. The entry detection apparatus 10 is mounted on a vehicle with a GPS antenna 21 (the vehicle may be referred to as the own vehicle hereinafter) for detecting whether the vehicle has entered an entry prohibited road. As shown in FIG. 1, the entry detection apparatus 10 is implemented as a computer including a CPU, a ROM, a RAM and an I/O module. The entry detection apparatus 10 includes a position detection unit 11, a sign detection unit 12 and an entry determination unit 13. The CPU of the entry detection apparatus 10 executes programs stored in the ROM to provide the functions of these units.

GPS signals received by the GPS antenna 21 are supplied to a position acquisition device 22 mounted on the vehicle. The position acquisition device 22 calculates, as position data, the latitude and longitude of the position of the vehicle, and supplies them to the position detection unit 11.

The position detection unit 11 detects the road section in which the vehicle is running based on position information received from the position acquisition device 22 and map data acquired from a storage device 20 mounted on the vehicle.

FIG. 2 is a diagram showing contents of link information contained in the map data. The link information includes, for each link, a link ID unique to the link, a road type including information showing the type of a road section corresponding to the link, a following-link information showing a structure included in the following link that connects to the current link in which the own vehicle is present, and entry prohibition information showing that the current link connects to an entry prohibited link. The road type includes an express way, a local way and so on. The following-link information shows a road ancillary structure such as a ramp or a service area included in the following link. The entry prohibition information indicates "No-entry from right direction", when the current link connects to an entry prohibited link at its right side, indicates "No-entry from left direction", when the current link connects to an entry prohibited link at its left side, and indicates "No-entry from straight direction" when the current link connects to an entry prohibited link at its center.

When no road ancillary structure is included in the following link, the following-link information is blank. When the current link is not connected to an entry prohibited link, the entry prohibition information is blank.

The position detection unit 11 identifies the current link in which the vehicle is present based on the position data acquired from the position acquisition device 22. At this time, the distance to the connection part of the link is also calculated. If the current link in which the vehicle is present includes entry prohibition information which is not blank, and the following link is shown to include a ramp or a service area, the position detection unit 11 determines that an entry prohibited road is present ahead of the own vehicle, and there is a risk that the own vehicle will run into this entry prohibited road. This is because, in most ramps and service area, the entry route and the exit route are one way roads, and they are provided adjacent to the running lane. In this case, the determination result that an entry prohibited road is present ahead of the own vehicle is sent to the entry determination unit 13.

Incidental, the map data stored in the storage device 20 is used also in a car navigation device (not shown) to display a map or search a route.

The vehicle is provided with an image sensor 30. The image sensor 30 is a monocular camera such as CCD camera or a CMOS image sensor. The image sensor 30 is mounted so as to be located at a predetermined height and at the center in the vehicle width direction. The image sensor 30 captures, from a bird's eye view point, an image of an imaging range spreading in front of the vehicle at a predetermined angle.

An image captured by the image sensor 30 is supplied to an image processing device 31 mounted on the own vehicle. The image processing device 31 generates an edge image by enhancing the contour of each object present in the supplied image, and extracts, as sign candidate areas, areas in each of which an object having a circular contour is present from the edge image. Then, for each of the extracted sign candidate areas, it is identified which road sign corresponds to the object in the extracted sign candidate area. Here, it is assumed that a no-entry sign is identified. A linear identification device may be used in a hierarchical manner for such identification. The color of the object present in each of the extracted sign candidate areas may be identified to increase the accuracy of the identification.

The image processing device 31 calculates the diameter of each identified sign on the image, and the distance to each identified sign. The distance to the identified sign can be calculated using a prestored relationship between the diameter of this sign on the image and the distance to this sign, for example. Further, the relative positions of the own vehicle and each sign are obtained by calculating a deviation of each sign from the vertical center line of the image.

Upon detecting the no-entry sign, the image processing device 31 sends image information showing the position of the no-entry sign to the sign detection unit 12. Alternatively, the image processing device 31 may send image information showing the position and the diameter of the no-entry sign on the image to the sign detection unit 12, so that the sign detection unit 12 can calculate the position of the no-entry sign based on the image information.

Figure 3:
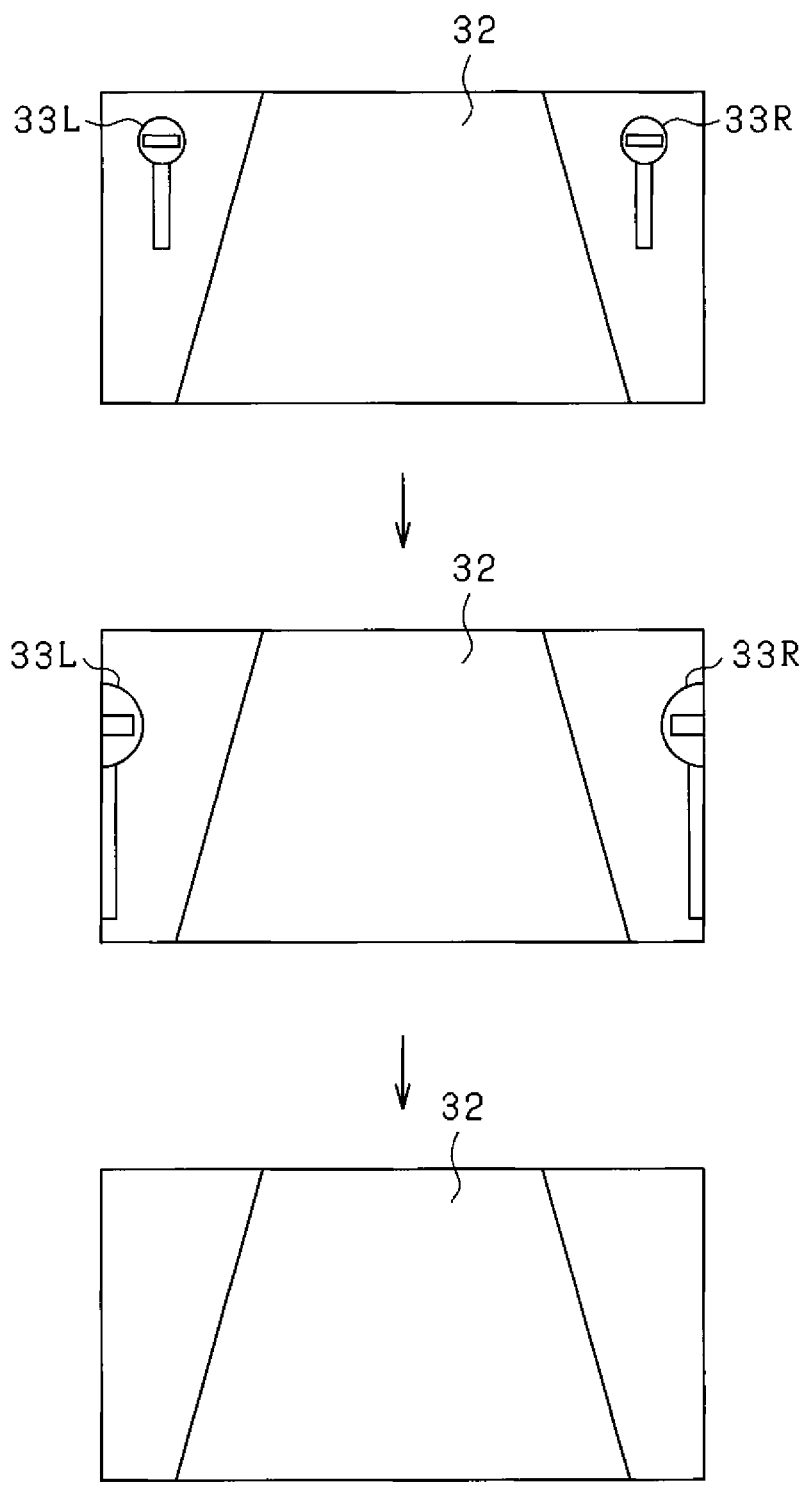
FIG. 3 is a diagram showing images captured by an image sensor mounted on an own vehicle when the own vehicle runs between two no-entry signs.

The sign detection unit 12 determines whether the own vehicle has passed between a pair of no-entry signs 33L and 33R. FIG. 3 shows images captured by the image sensor 30 in chronological order when the own vehicle runs between the pair of the no-entry signs 33L and 33R. First, when the own vehicle approaches an entry prohibited road 32, the no-entry signs 33L and 33R arranged at a predetermined interval therebetween ahead of the own vehicle are photographed. When the own vehicle further approaches the entry prohibited road 32, the no-entry signs 33L and 33R go out of the imaging range from the left and right edges of the image, respectively. Upon detecting that no-entry signs 33L and 33R have gone out of the imaging range, the sign detection unit 12 determines that the own vehicle has passed between the no-entry signs 33L and 33R. Upon determining that the own vehicle has passed between the no-entry signs 33L and 33R, the sign detection unit 12 sends this determination result to the entry determination unit 13.

The sign detection unit 12 may be configured to determine that the pair of the no-entry signs are installed on opposite sides of an entry prohibited road only if the interval between them is smaller than an interval threshold of 10 meters. The reason of that is to prevent that two no-entry signs of two different lanes are erroneously determined to be paired no-entry signs of an entry prohibited road. Incidentally, if the interval threshold is set smaller than 5 meters, there is a risk that a wide entry prohibited road having two or more lanes may be determined to be not an entry prohibited road. Here, the interval between the two signs may be the distance between their centers, or between their inner edges, or between their outer edges.

Depending on the installation place of the image sensor 30 on the own vehicle and the installation places of the no-entry signs, it may occur that the no-entry signs go out of the imaging range from the upper edge of the image instead of the left and right edges. Accordingly, the sign detection unit 12 may be configured to determine that the own vehicle has passed between no-entry signs, if each of these no-entry signs are present in the left half and right half of the image, respectively, and have gone out of the imaging area.

The entry determination unit 13 acquires the determination result showing whether or not an entry prohibited road is present ahead of the own vehicle from the position detection unit 11, and acquires the determination result showing whether or not the own vehicle has passed between two no-entry signs from the sign detection unit 12. If both the determination results are affirmative, a warning is given to the vehicle driver using at least one of a display device 40 and a warning device 41 mounted on the own vehicle.

Figure 4:
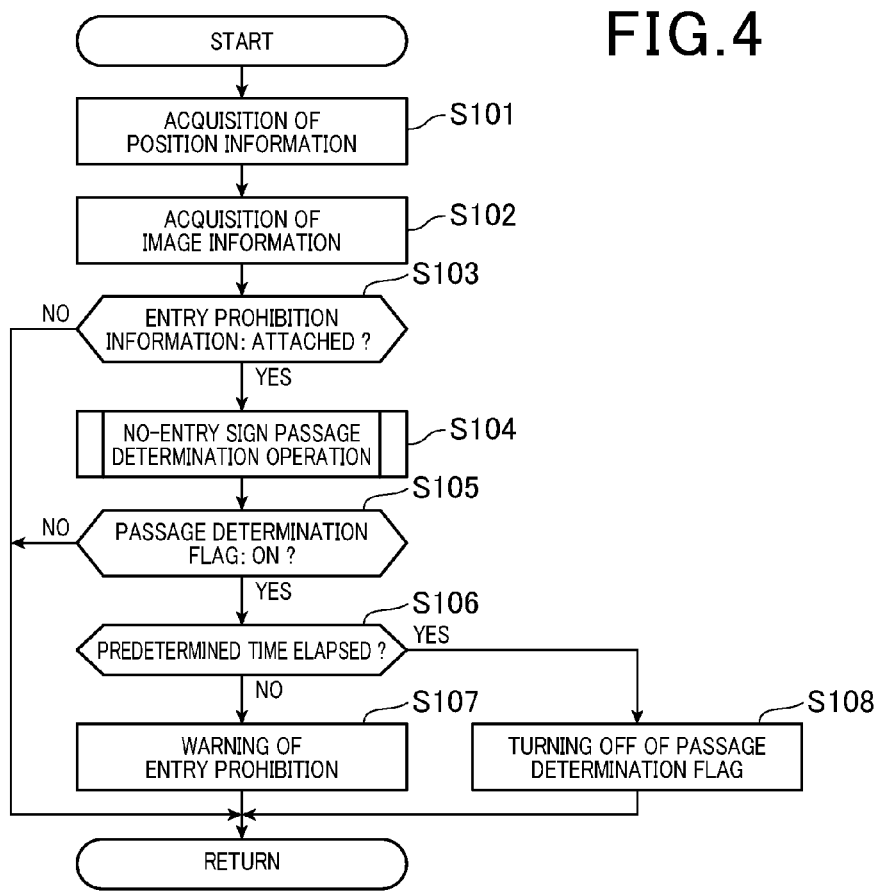
FIG. 4 is a diagrams showing steps of a process performed by the entry detection apparatus.

FIG. 4 is a diagram showing steps of a process performed at regular time intervals by the entry detection apparatus 10.

The process begins in step S101 to acquire the position information, and then proceeds to step S102 to acquire the image information. In subsequent step S103, it is determined whether the current link corresponding to the position information is attached with the entry prohibition information and the following link is provided with a ramp or a service area. The determination result in step S103 is held until the own vehicle enters the following link. If the determination result in step S103 is affirmative, the process proceeds to step S104 where it is determined whether or not the own vehicle has passed between two no-entry signs. The operation of step S104 is referred to as the "no-entry sign passage determination operation" hereinafter. If the own vehicle is determined to have passed between two no-entry signs, a passage determination flag is turned on, and otherwise turned off.

In subsequent step S105, it is determined whether the passage determination flag is on or not. If the determination result in step S105 is affirmative, the process proceeds to step S106 where it is determined whether or not a predetermined time has elapsed since the start of a warning of entry prohibition. The operation of step S106 is for preventing the warning of entry prohibition from becoming excessive. If the determination result in step S106 is negative, the process proceeds to step S107 to continue the warning of entry prohibition. Then, the process is terminated. On the other hand, if the determination result in step S106 is affirmative, the process proceeds to step S108 to turn off the passage determination flag. Then, the process is terminated.

Figure 5:
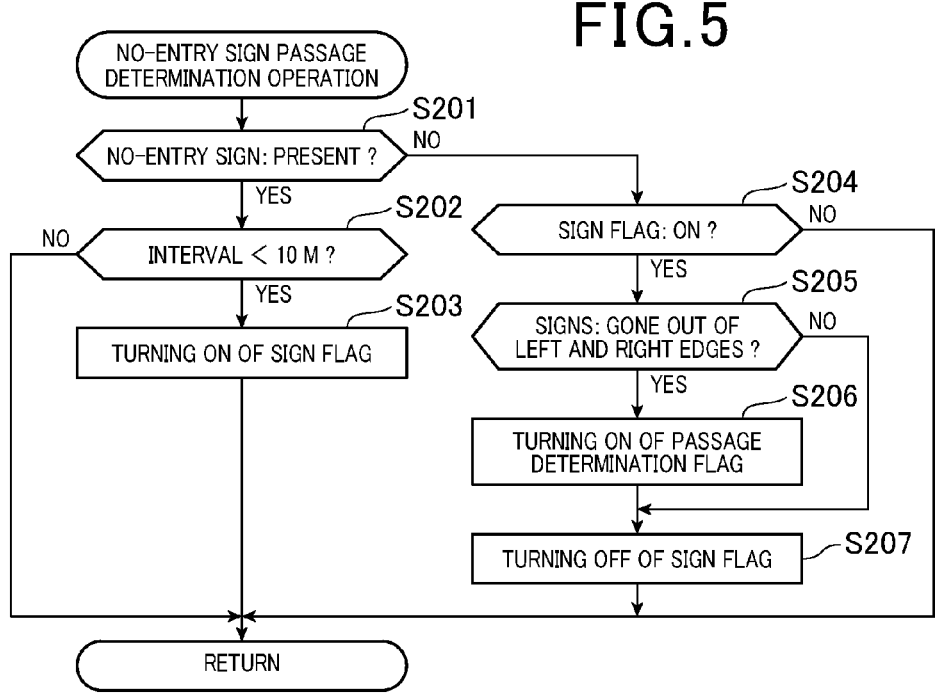
FIG. 5 is a diagram showing steps of a sub-routine of the process shown in FIG. 4.

Next, the subroutine of the no-entry sign passage determination operation in step S104 is explained with reference to FIG. 5. This operation begins in step S201 to determine whether or not two no-entry signs are present ahead of the own vehicle. If the determination result in step S201 is affirmative, the operation proceeds to step S202 to determine whether or not the interval between them is smaller than 10 meters. If the determination result in step S202 is negative, the operation is terminated assuming that these two no-entry signs are not paired no-entry signs provided in an entry prohibited road ahead of the own vehicle. If the determination result in step S202 is affirmative, the operation proceeds to step S203 to turn on a sign flag showing a presence of an entry prohibited road ahead of the own vehicle. Then, the operation is terminated.

On the other hand, if the determination result in step S201 is negative, the operation proceeds to step S204 to detect whether or not the sign flag is on. Step S204 is for determining whether the state in which the no-entry signs are being detected has been changed to the state in which the no-entry signs are not being detected, or the state in which no-entry sign are detected is continuing. If the determination result in step S204 is negative, since it means that the state in which no-entry signs are detected is continuing, the operation is terminated.

On the other hand, if the determination result in step S204 is affirmative, it means that the state in which the no-entry signs are being detected has been changed to the state in which the no-entry signs are not detected. Accordingly, the operation proceeds to step S205 to determine whether or not the no-entry signs went out of the imaging region from the left and right edges of the imaging range, respectively. This determination is made by referring to the positions of the no-entry signs detected in the process performed at the previous time. If the determination result in step S205 is affirmative, since it means that the own vehicle has passed between the no-entry signs, the operation proceeds to step S206 to turn on the passage determination flag, and subsequently proceeds to step S207 to turn off the sign flag. Then, this operation is terminated. On the other hand, if the determination result in step S205 is negative, since it is very probable that the own vehicle has passed near an entry prohibited road, the operation proceeds to step S207 to turn off the sign flag. Then, this operation is terminated.

Normally, when the own vehicle run between road signs, the road signs go out of the imaging range at nearly the same time. However, in a case where the own vehicle runs off the center of the road, or a case where the road include a plurality of lanes, it may occur that one of the road signs goes out of the imaging range first, and then the other road sign goes out of the imaging range a little later. Accordingly, the above operation may be modified such that the on state of the sign flag is maintained after one of the road signs goes out of the imaging range from one of the left and right edges of the image, and when the other road sign goes out of the imaging range from the other edge thereafter, the passage determination flag is turned on and the sign flag is turned off.

The entry detection apparatus 10 described above provides the following advantages.

If a determination of whether or not the own vehicle has entered an entry prohibited road is made based on only the detection result of the position detection unit 11, the determination may be incorrect depending the accuracy of the position of the own vehicle detected by the position detection unit 11. On the other hand, if this determination is made based on only the detection result of the sign detection unit 12, the determination may be incorrect depending on the installation place of no-entry signs. According to the above embodiment, since the entry determination unit 13 determines that the own vehicle has entered an entry prohibited road based on both the detection result of the position detection unit 11 and the detection result of the sign detection unit 12, it is possible to correctly determine whether the own vehicle has entered an entry prohibited road.

Inmost ramps and service area, the entry route and the exit route are one way roads, and they are provided in adjacent to the running lane. According to the above embodiment, the own vehicle is determined to be running on an entry prohibited road if the following link that connects to the current link in which the own vehicle is present is provided with a ramp or a service area, and the current link is attached with information showing entry prohibition. Accordingly, according to the above embodiment, it is possible to reliably determine whether or not the own vehicle has entered an entry prohibited road.

Modifications

It is a matter of course that various modifications can be made to the above described embodiment as described below.

The link information does not always show that no-entry signs are installed at the end part of the link. Accordingly, the own vehicle may be determined to have entered an entry prohibited road based on the detection result of the sign detection unit 12 after the own vehicle has entered the following link provided with a ramp or the like from the current link attached with entry prohibition information, or before the own vehicle enters the following link. Accordingly, the detection result of the position detection unit 11 may be held until the distance from the own vehicle to the connection point between the current link and the following link exceeds a predetermined value (20 meters, for example) to increase the reliability of the detection result of the position detection unit 11.

The following-link information used by the position detection unit 11 to detect a presence of an entry prohibited road is not limited to the one described in the above embodiment. For example, the following-link information may show that the following link is an overpass or an underpass.

In the above embodiment, a determination of whether an entry prohibited road is present ahead of the own vehicle is made using the following link information. However, the determination may be made based on whether the current link in which the own vehicle is present is attached with entry prohibition information.

The entry detection apparatus 10 may be part of the car navigation device.

In the above embodiment, a warning is given to the vehicle driver using the display device 40 and the warning device 41. However, if the own vehicle is provided with an automatic driving function, when the entry determination unit 13 determines that the own vehicle has entered an entry prohibited road, the vehicle may be caused to avoid this entry prohibited road.

The above explained preferred embodiments are exemplary of the invention of the present application which is described solely by the claims appended below. It should be understood that modifications of the preferred embodiments may be made as would occur to one of skill in the art.

What is claimed is:

1. An entry detection apparatus comprising:
a position detection unit that detects presence of an entry prohibited road ahead of a vehicle based on a position of the vehicle and map data including information showing, for each road section, whether the road section is an entry prohibited road section;
a sign detection unit that detects whether or not a pair of no-entry signs are present on opposite sides of a running course of the vehicle based on an image captured by an image sensor mounted on the vehicle, and determines whether or not the vehicle has passed between the no-entry signs; and
an entry determination unit that determines that the vehicle has entered the entry prohibited road if the position detection unit detects presence of the entry prohibited road, and the sign detection unit determines that the vehicle has passed between the no-entry signs,
wherein the map data includes link information identifying each road section, the link information including information showing, for each road section, whether the road section is an entry prohibited road section,
wherein the link information includes, for each road section, information showing whether a ramp is connected thereto, and the position detection unit determines that an entry prohibited road is present ahead of the vehicle if the link information shows that a current road section in which the vehicle is running includes entry prohibition information, and is connected to a ramp, and
wherein the position detection unit determines that the entry prohibited road is present ahead of the vehicle on condition that a distance from the vehicle to a connection part between the current link and a following link is smaller than a predetermined value.

2. The entry detection apparatus according to claim 1, wherein the sign detection unit determines that the vehicle has passed between the no-entry signs upon detecting a change from a state in which the no-entry signs are present in the image to a state in which the no-entry signs are not present in the image.

3. The entry detection apparatus according to claim 2, wherein the sign detection unit determines that the vehicle has passed between the no-entry signs upon detecting that the no-entry signs have gone out of the image from a left edge and a right edge of the image, respectively.

4. The entry detection apparatus according to claim 1, wherein the sign detection unit determines whether or not the vehicle has passed between the no-entry signs on condition that an interval between the no-entry signs is smaller than 10 meters.

5. An entry detection apparatus comprising:
position detection unit that detects presence of an entry prohibited road ahead of a vehicle based on a position of the vehicle and map data, including information showing, for each road section, whether the road section is an entry prohibited road section;
a sign detection unit that detects whether or not a pair of no-entry signs are present on opposite sides of a running course of the vehicle based on an image captured by an image sensor mounted on the vehicle, and determines whether or not the vehicle has passed between the no-entry signs; and
an entry determination unit that determines that the vehicle has entered the entry prohibited road if the position detection unit detects presence of the entry prohibited road, and the sign detection unit determines that the vehicle has passed between the no-entry signs,
wherein the map data includes link information identifying each road section, the link information including information showing, for each road section, whether the road section is an entry prohibited road section,
wherein the link information includes, for each road section, information showing whether a service area is connected thereto, and the position detection unit determines that an entry prohibited road is present ahead of the vehicle if the link information shows that a current road section in which the vehicle is running includes entry prohibition information, and is connected to a service area.

6. The entry detection apparatus according to claim 5, wherein the position detection unit determines that the entry prohibited road is present ahead of the vehicle on condition that a distance from the vehicle to a connection part between the current link and a following link is smaller than a predetermined value.

7. The entry detection apparatus according to claim 5, wherein the sign detection unit determines that the vehicle has passed between the no-entry signs upon detecting a change from a state in which the no-entry signs are present in the image to a state in which the no-entry signs are not present in the image.

8. The entry detection apparatus according to claim 7, wherein the sign detection unit determines that the vehicle has passed between the no-entry signs upon detecting that the no-entry signs have gone out of the image from a left edge and a right edge of the image, respectively.

9. The entry detection apparatus according to claim 5, wherein the sign detection unit determines whether or not the vehicle has passed between the no-entry signs on condition that an interval between the no-entry signs is smaller than 10 meters.

* * * * *